(12) United States Patent
Yamashita

(10) Patent No.: US 6,328,382 B1
(45) Date of Patent: Dec. 11, 2001

(54) LOCKING STRUCTURE FOR A RECLINING SEAT

(75) Inventor: Mitsuhiro Yamashita, Aki-gun (JP)

(73) Assignee: Delta Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 09/329,325

(22) Filed: Jun. 10, 1999

(30) Foreign Application Priority Data

Aug. 4, 1998 (JP) ............................................. P 10-220615

(51) Int. Cl.7 ..................................................... B60N 2/10
(52) U.S. Cl. ........................................... 297/367; 297/369
(58) Field of Search ................................... 297/367, 368, 297/369

(56) References Cited

U.S. PATENT DOCUMENTS

| | | | |
|---|---|---|---|
| 5,749,626 | * | 5/1998 | Yoshida ................................. 297/367 |
| 5,762,400 | * | 6/1998 | Okazaki et al. ...................... 297/367 |
| 5,816,656 | * | 10/1998 | Hoshihara et al. .............. 297/367 X |
| 5,873,630 | * | 2/1999 | Yoshida et al. .................. 297/367 X |

FOREIGN PATENT DOCUMENTS

| | | |
|---|---|---|
| 0 232 192 | 8/1987 | (EP) . |
| 0 773 133 | 5/1997 | (EP) . |
| 0 858 927 | 8/1998 | (EP) . |
| 8-214978 | 8/1996 | (JP) . |

* cited by examiner

Primary Examiner—Anthony D. Barfield
(74) Attorney, Agent, or Firm—Wenderoth, Lind & Ponack, L.L.P.

(57) ABSTRACT

A reclining seat has a seat cushion and a seat back pivotally mounted on the seat cushion. A locking structure for the reclining seat include first and second brackets fixed to the seat cushion and the seat back, respectively. The locking structure also includes two arcuated guide members formed on the first bracket and an internally-toothed gear formed on the second bracket. The two guide members are received in a recess formed inside the internally-toothed gear, and two lock gears and a cam for moving them in opposite directions are interposed between the two guide members. Each lock gear has a pawl engageable with the internally-toothed gear. Each guide member has a guide recess defined therein and positioned away from the cam, and the associated lock gear is slidably received in the guide recess.

5 Claims, 7 Drawing Sheets

LOCKING STRUCTURE FOR A RECLINING SEAT

BACKGROUND OF THE INVENTION

1. Field of the Invention

The present invention relates generally to a reclining seat having a seat cushion and a seat back pivotally mounted on the seat cushion and, in particular but not exclusively, to a locking structure for the reclining seat to lock the seat back relative to the seat cushion.

2. Description of the Related Art

Japanese Laid-Open Patent Publication (unexamined) No. 8-214978 discloses a reclining structure for use in a reclining seat. This reclining structure includes a lower arm mounted on a rear end of a seat cushion, an upper arm mounted on a lower end of a seat back, an internally-toothed gear formed on the upper arm, a pair of protruding portions formed on the lower arm and placed inside the internally toothed gear, two guide grooves defined between the pair of protruding portions, and a pair of pawls received in the two guide grooves, respectively, so as to be movable in opposite directions.

The pair of pawls are placed symmetrically with respect to an operation shaft connected to an operation lever. Upon operation of the operation lever, the pair of pawls are moved between a locked position where the pawls engage with the internally-toothed gear and an unlocked position where the pawls disengage from the internally-toothed gear. When the pawls are held at the locked position, rotation of the seat back about the operation shaft is prevented, thereby maintaining the posture of the seat back relative to the seat cushion. In contrast, when the pawls are held at the unlocked position, the angle of inclination of the seat back relative to the seat cushion can be changed by rotating the seat back about the operation shaft.

Recently, the locking structure tends to be made compact, followed by miniaturization of its component parts. However, if the size of the pawls is reduced, the area of contact between the pawls and the pair of protruding portions is reduced. As a result, the pawls cannot be positively supported by the protruding portions and readily chatter within the guide grooves, thus making it impossible to stably maintain the posture of the seat back and lowering the comfort of sitting on the seat.

Furthermore, it is likely that a "biased action" will occur in which only one of the pawls is held in mesh with the internally-toothed gear due to manufacturing errors, making it difficult to set the seat back at a desired angle of inclination.

SUMMARY OF THE INVENTION

The present invention has been developed to overcome the above-described disadvantages.

It is accordingly an objective of the present invention to provide a locking structure for a reclining seat capable of locking the seat back relative to the seat cushion without looseness and preventing the "biased action" of the pair of pawls.

Another objective of the present invention is to provide the locking structure of the above-described type which can be readily manufactured at a low cost.

In accomplishing the above and other objectives, a locking structure according to the present invention includes a first bracket fixed to the seat cushion and a second bracket fixed to the seat back. First and second projections are formed on one of the first and second brackets, and each of them has first and second flat surfaces opposite to each other. The first and second flat surfaces of the first projection confront the second and first flat surfaces of the second projection, respectively, and extend parallel thereto. The other of the first and second brackets has a recess defined therein and an internally-toothed gear formed around such recess. The first and second projections are received in the recess so that the second bracket can be rotated relative to the first bracket. The locking structure also includes first and second lock gears each having a pawl engageable with the internally-toothed gear. The first lock gear is slidably interposed between the first flat surface of the first projection and the second flat surface of the second projection, while the second lock gear is slidably interposed between the second flat surface of the first projection and the first flat surface of the second projection. A cam is provided to move the first and second lock gears selectively away from and towards each other; and a cam shaft is connected to the cam for rotation together therewith and is loosely inserted into a center hole defined in the first bracket and into a center hole defined in the second bracket.

According to the above-described locking structure, rotation of the seat back relative to the seat cushion is normally prevented by the engagement of the pair of pawls with the internally-toothed gear, thereby maintaining the angle of inclination of the seat back. When the cam is rotated in a predetermined direction, the pair of lock gears are moved towards each other while being guided along the first and second projections, respectively, thereby releasing the engagement of the pawls with the internally-toothed gear. As a result, the second bracket is allowed to rotate about the cam shaft, making it possible to rotate the seat back relative to the seat cushion.

Thereafter, when the seat back has been set at a desired angle of inclination and when the cam is rotated in a direction opposite to the predetermined direction referred to above, the pair of lock gears are moved away from each other and the pawls are brought into engagement with the internally-toothed gear, thereby preventing rotation of the second bracket about the cam shaft and maintaining this posture of the seat back relative to the seat cushion.

Furthermore, because the cam shaft is loosely inserted into the center holes of the first and second brackets, even if the longitudinal axis of the cam shaft is not properly aligned therewith, the cam can be smoothly rotated by the cam shaft, making it possible to positively operate the pair of lock gears and prevent the "biased action" which has been hitherto caused due to dimensional errors and in which only one of the lock gears is held in engagement with the internally-toothed gear.

Advantageously, each of the first and second lock gears has first and second flat surfaces extending in a direction of movement thereof. In this case, when the cam is rotated, the first flat surface of the first lock gear is held in sliding contact with the second flat surface of the second lock gear, while the second flat surface of the first lock gear is similarly held in sliding contact with the first flat surface of the second lock gear.

With this arrangement, not only are the pair of lock gears held in sliding contact with each other along the flat surfaces thereof extending in the direction of movement thereof, but also both of them are guided by the two guide members under the condition in which the former are interposed between the latter, thereby reducing looseness of the lock gears.

Conveniently, third and fourth projections are formed on the first and second projections, respectively, and slidably received in a guide groove formed radially inwardly of the internally-toothed gear.

With this arrangement, because the internally-toothed gear is positioned radially outwardly of the guide groove, it becomes possible to reduce the locking pitch (the central angle of two neighboring teeth of the internally-toothed gear) at which rotation of the second bracket relative to the first bracket is locked, resulting in accurate positioning of the seat back.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on application No. 10-220615 filed Aug. 4, 1998 in Japan, the content of which is incorporated hereinto by reference.

Figure 1:
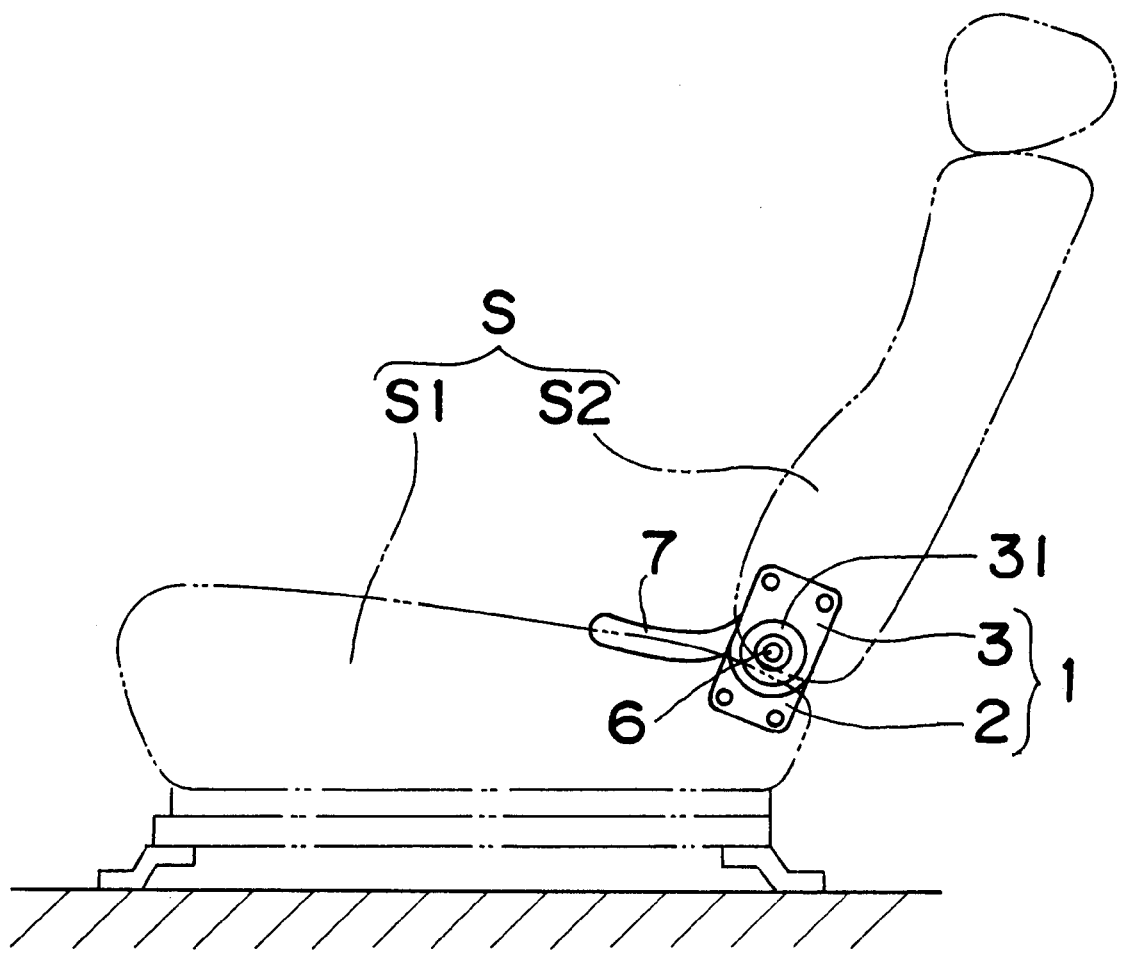
FIG. 1 is a side view of a reclining seat having a locking structure according to the present invention.

FIG. 1 depicts a reclining seat S having a locking structure according to a first embodiment of the present invention. The reclining seat S is employed in, for example, an automotive vehicle and includes a seat cushion S1 and a seat back S2 pivotally mounted on the seat cushion S1 at a rear edge thereof. The reclining seat S also includes a pair of reclining devices 1 mounted on respective sides thereof for inclining the seat back S2 relative to the seat cushion S1 between a folded position and a generally flat position. The seat back S2 shown in FIG. 1 is set in an erected position that is an intermediate position between the folded position and the generally flat position.

Figure 2:
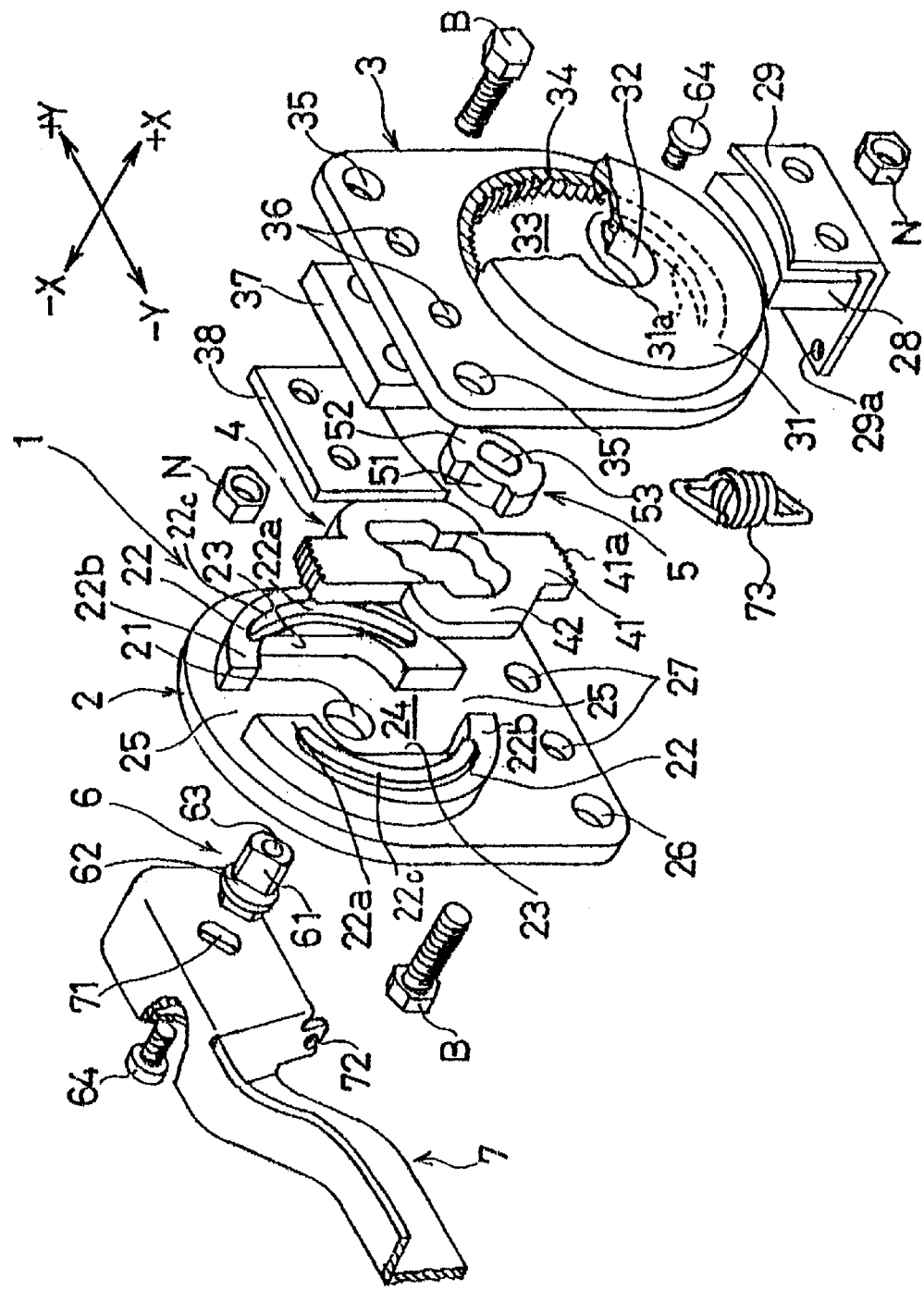
FIG. 2 is an exploded perspective view of a reclining device according to a first embodiment of the present invention.
Figure 3:
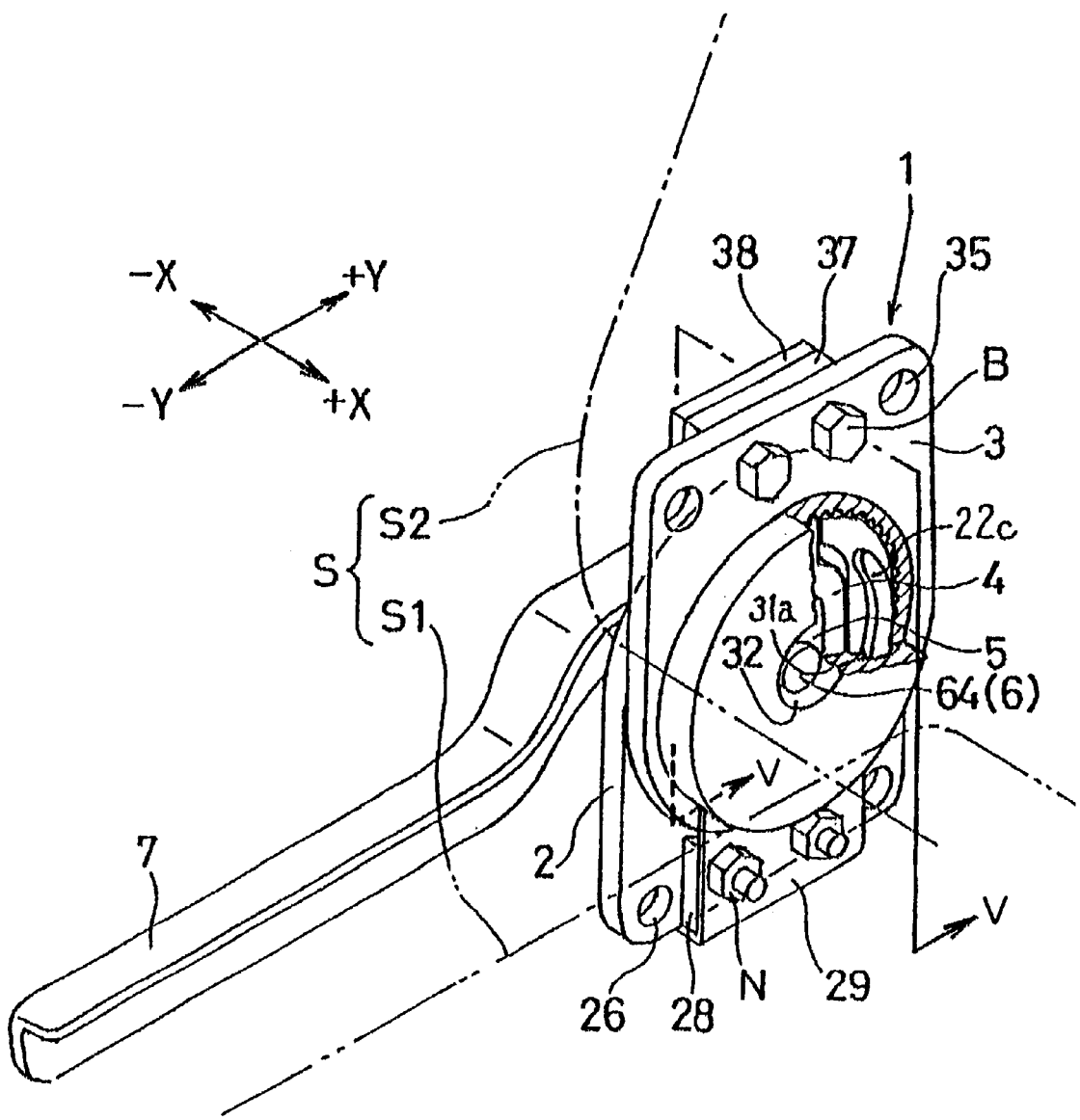
FIG. 3 is a perspective view of the reclining device of FIG. 2.

FIGS. 2 and 3 depict one of the reclining devices 1 that is located on the left side of the reclining seat S as viewed from the front. In FIGS. 2 and 3, the X—X direction is referred to as the widthwise direction, while the Y—Y direction is referred to as the longitudinal direction. In particular, the "–X" and "+X" directions are referred to as "left" and "right", respectively, while the "–Y" and "+Y" directions are referred to as "front" and "rear", respectively.

As shown in FIGS. 2 and 3, the reclining device 1 includes a first bracket 2 secured to the seat cushion S1, a second bracket 3 secured to the seat back S2 so as to confront the first bracket 2, a pair of lock gears 4 interposed between the first and second brackets 2 and 3, a cam 5 secured to a center shaft or cam shaft 6 for rotation together therewith so as to operate the lock gears 4, and an operation lever 7 for rotating the center shaft 6.

It is to be noted here that although the reclining seat S has been described as including a pair of reclining devices 1, one of them is not provided with the operation lever 7, but is operated by an extension rod connected to the center shaft 6.

The first bracket 2 is made of a metallic planar member having an upper semicircular portion and a lower rectangular portion. The first bracket 2 has a center or insertion hole 21 defined therein into which the center shaft 6 is inserted. The insertion hole 21 is positioned at the center of curvature of the upper semicircular portion. The first bracket 2 also has a pair of longitudinally spaced guide members; 22 formed on the right side surface thereof so as to protrude therefrom. The pair of guide members 22 are arcuated members centered at the insertion hole 21 and are point-symmetrical with respect thereto.

Each of the guide members 22 has a vertically elongated guide recess 23 defined therein on the inner side thereof. The front guide member 22 has a vertically long upper end 22a and a vertically short lower end 22b positioned above and below the guide recess 23, respectively. In contrast, the rear guide member 22 has a vertically short upper end 22b and a vertically long lower end 22a positioned above and below the guide recess 23, respectively.

The lock gears 4 and the cam 5 are accommodated in a space 24 between the front and rear guide recesses 23. A vertical surface of the upper end 22a of the front guide member 22 and that of the upper end 22b of the rear guide member 22 extend parallel to each other and define a guide groove 25 therebetween for guiding a pawl 41 of one of the lock gears 4. Similarly, a vertical surface of the lower end 22b of the front guide member 22 and that of the lower end 22a of the rear guide member 22 extend parallel to each other and define a guide groove 25 therebetween for guiding a pawl 41 of the other lock gear 4. The two guide grooves 25 are positioned on upper and lower sides of the insertion hole 21, respectively, and have the same width.

Each of the guide members 22 has an arcuated guide projection 22c formed on the right side surface thereof. The guide projection 22c is concentric with the outer surface of the associated guide member 22 and is inserted into a guide groove 31a defined in the second bracket 3.

On the other hand, the second bracket 3 is made of a planar member having an upper rectangular portion and a lower semicircular portion. The second bracket 3 has a circularly protruding portion 31 formed on the right side surface thereof and centered at the center of curvature of the lower semicircular portion. The circularly protruding portion 31 has a through-hole 32 defined therein at the center thereof so as to confront the insertion hole 21 of the first bracket 2. The through-hole 32 of the second bracket 3 has a diameter greater than that of the insertion hole 21 of the first bracket 2, which is greater than that of the cam shaft 6.

Because the cam shaft 6 is loosely inserted in both the insertion hole 21 and the through-hole 32, even if the longitudinal axis of the cam shaft 6 is not properly aligned with the insertion hole 21 and the through-hole 32 due to dimensional error, the cam shaft 6 can be smoothly rotated relative to the pair of lock gears 4, making it possible to positively operate the pair of lock gears 4 and preventing the "biased action" in which only one of the lock gears 4 is held in mesh with an internally-toothed gear 34.

The second bracket 3 has a generally circular recess 33 defined therein on the left side of the circularly protruding portion 31. The generally circular recess 33 has a radius slightly greater than the radius of curvature of the pair of the guide members 22 of the first bracket 2. When the first and second brackets 2 and 3 are mated with each other, both of the guide members 22 of the first bracket 2 are loosely inserted into the generally circular recess 33 of the second bracket 3.

The circularly protruding portion 31 of the second bracket 3 has a guide groove 31a defined therein on the left side thereof and having the same radius of curvature as the arcuated guide projections 22c of the guide members 22. Insertion of the arcuated guide projections 22c into the guide groove 31a ensures rotation of the second bracket 3 relative to the first bracket 2.

The second bracket 3 has an internally-toothed gear 34 referred to above, and the generally circular recess 33 is formed inside the internally-toothed gear 34. Because the internally-toothed gear 34 is positioned radially outwardly of the guide groove 31a of the circularly protruding portion 31, it becomes possible to reduce the locking pitch (the central angle of two neighboring teeth of the internally-toothed gear 34) at which rotation of the second bracket 3 relative to the first bracket 2 is locked, resulting in accurate positioning of the seat back S2.

The second bracket 3 has front and rear mounting holes 35 defined therein on the upper side thereof, through which the second bracket 3 is bolted to the seat back S2. The second bracket 3 also has front and rear bolt holes 36 defined therein between the two mounting holes 35. An upper holding plate 38 and an upper spacer 37 have similar bolt holes and are secured to the left side surface of the second bracket 3 by means of bolts B and nuts N. The upper spacer 37 has a thickness slightly greater than that of the first bracket 2.

The first bracket 2 has front and rear mounting holes 26 defined therein on the lower side thereof, through which the first bracket 2 is bolted to the seat cushion S1. The first bracket 2 also has front and rear bolt holes 27 defined therein between the two mounting holes 26. An L-shaped lower holding plate 29 and a lower spacer 28 have similar bolt holes and are secured to the right side surface of the first bracket 2 by means of bolts B and nuts N. The lower spacer 28 has a thickness slightly greater than that of the second bracket 3.

Figure 5:
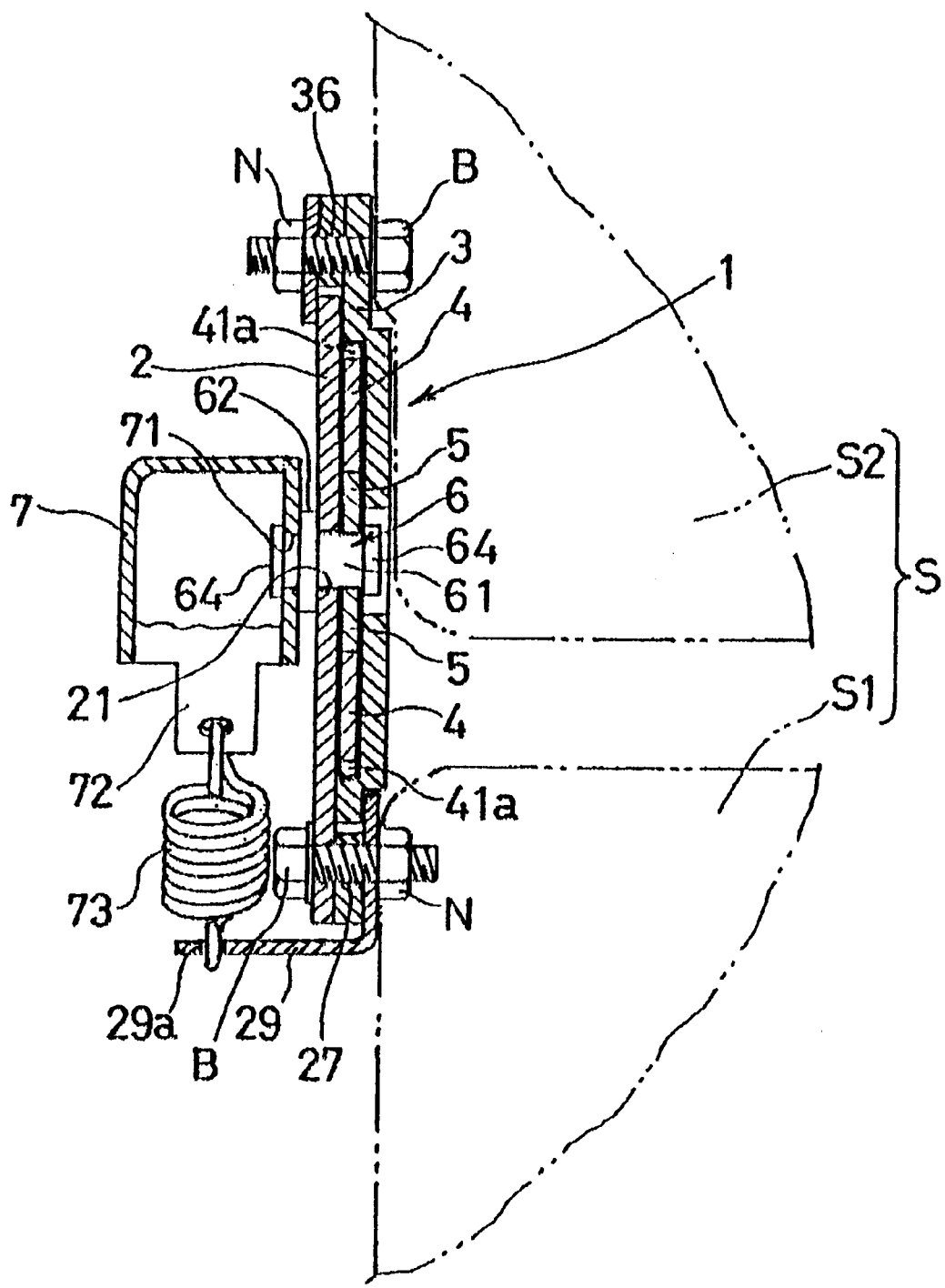
FIG. 5 is a cross sectional view taken along line V—V in FIG. 3.

With the above arrangement, after the guide members 22 of the first bracket 2 have been inserted into the circular recess 33 of the second bracket 3, the upper holding plate 38 is bolted to the second bracket 3 with the upper spacer 37 interposed therebetween, while the lower holding plate 29 is bolted to the first bracket 2 with the lower spacer 28 interposed therebetween. As a result, as shown in FIG. 5, the upper edge of the first bracket 2 is placed between the lower edge of the upper holding plate 38 and the second bracket 3, while the lower edge of the second bracket 3 is placed between the upper edge of the lower holding plate 29 and the first bracket 2. The first and second brackets 2 and 3 are thus rotatably connected together.

Figure 4:
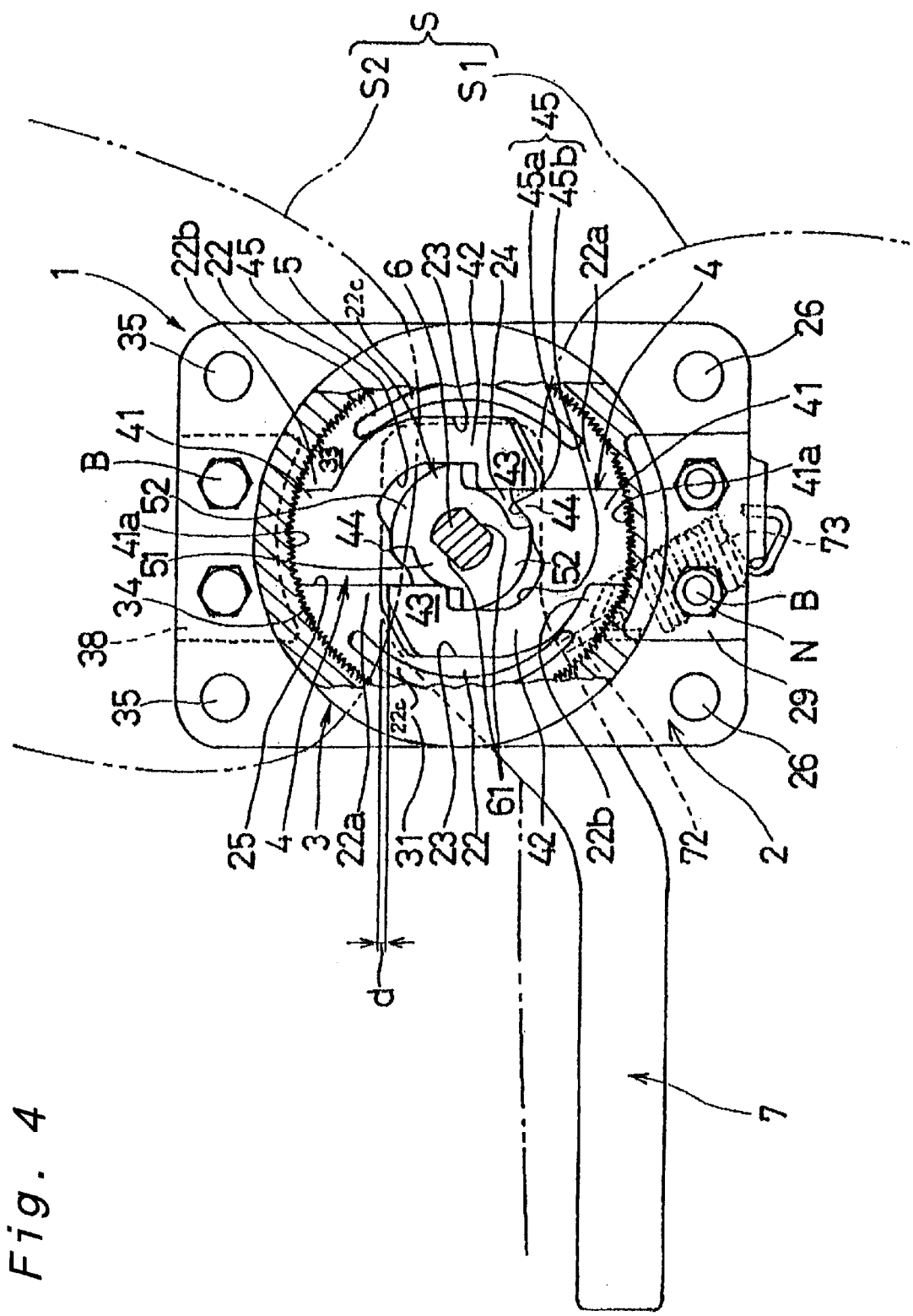
FIG. 4 is a side view, partly in section, of the reclining device of FIG. 3.

As shown in FIG. 4, each of the lock gears 4 includes a pawl 41 and a leg 42 integrally formed with each other. The pawl 41 is vertically movable along the guide groove 25 defined between the vertical surfaces of the upper or lower ends 22a and 22b of the pair of guide members 22. The leg 42 extends obliquely downwards or upwards from the pawl 41 away from the insertion hole 21 of the first bracket 2 so as to be slidably accommodated in the guide recess 23. The pawl 41 has teeth 41a formed on an upper or lower surface thereof, which are engageable with the internally-toothed gear 34 to prevent rotation of the second bracket 3 relative to the first bracket 2.

The leg 42 has an outer surface substantially complementary to an inner surface of the associated guide member 22, but a clearance (d) is provided therebetween, as shown in FIG. 4, allowing the leg 42 to vertically slide along the inner surface of the guide member 22 by the clearance (d). The clearance (d) is slightly greater than the depth of the teeth 41a of the pawl 41. Accordingly, when the lock gears 4 are moved radially outwardly away from the insertion hole 21, the teeth 41a of the pawl 41 are brought into engagement with the internally-toothed gear 34. In contrast, when the lock gears 4 are moved radially inwardly towards the insertion hole 21, the teeth 41a of the pawl 41 are disengaged from the internally-toothed gear 34.

The leg 42 has a projection 43 formed at a free end thereof remote from the pawl 41, while the pawl 41 has an acute-angled projection 44 formed at a portion hereof opposite to the teeth 41a. The projection 43 of the leg 42 protrudes towards a vertical center line of the first bracket 2 and has a flat vertical surface extending parallel thereto, while the acute-angled projection 44 of the pawl 41 protrudes towards a horizontal center line of the first bracket 2 and has a flat vertical surface extending parallel to the vertical center line of the first bracket 2. Each lock gear 4 has an inwardly curved recess 45 formed between the two projections 43 and 44 to accommodate a portion (fan-shaped projection 52 described later) of the cam 5.

In the case of the upper (rear) lock gear 4, the vertical surface of the acute-angled projection 44 of the pawl 41 is aligned with that of the upper end 22a of the front guide member 22, while the vertical surface of the projection 43 of the leg 42 is aligned with that of the lower end 22a of the rear guide member 22. In the case of the lower (front) lock gear 4, the vertical surface of the acute-angled projection 44 of the pawl 41 is aligned with that of the lower end 22a of the rear guide member 22, while the vertical surface of the projection 43 of the leg 42 is aligned with that of the upper end 22a of the front guide member 22. Accordingly, the projections 43 and 44 of the upper lock gear 4 are held in contact with the projections 44 and 43 of the lower lock gear 4, respectively, thereby ensuring the operation of the lock gears 4 within the space 24 shown in FIG. 2.

The cam 5 is made up of a cam body 51 having a predetermined diameter and two fan-shaped projections 52 extending radially outwardly from the cam body 51 on the opposite sides thereof. The cam body 51 has an elongated opening 53 defined therein at the center thereof, through which the center shaft 6 extends for rotation together therewith. Each fan-shaped projection 52 has a central angle of approximately 90° and also has two opposite corners that are held in sliding contact with the peripheral wall surface of the associated inwardly curved recess 45 during rotation of the cam together with the center shaft 6

More specifically, the inwardly curved recess 45 is delimited by an inclined surface 45a of the acute-angled projection 44 extending obliquely from a pointed end of the projection 44 towards the teeth 41a of the pawl 41 and also by an inwardly curved surface 45b extending between the inclined surface 45a and the projection 43.

When the cam 5 is rotated clockwise together with the center shaft 6, one of the two opposite corners of the fan-shaped projection 52 presses the projection 43 of the associated lock gear 4 in a direction to move the pawl 41 radially inwardly, thereby disengaging the teeth 41a from the internally-toothed gear 34. In contrast, when the cam 5 is rotated counterclockwise together with the center shaft 6, the other corner of the fan-shaped projection 52 presses the inclined surface 45a of the associated lock gear 4 in a direction to move the pawl 41 radially outwardly, thereby engaging the teeth 41a with the internally-toothed gear 34.

The center shaft 6 includes a shaft body 61, a flange 62 integrally formed with the shaft body 61, and two screws 64 screwed into respective threaded holes 63 formed on opposite ends thereof The shaft body 61 has a cross section similar to the elongated opening 53 of the cam body 51 for insertion of the former into the latter. The outer diameter of the shaft body 61 is determined such that the shaft body 61 may be loosely inserted into the insertion hole 21 of the first bracket 2, while the outer diameter of the flange 62 is determined to be greater than the inner diameter of the insertion hole 21. By so doing, when the shaft body 61 is inserted into the insertion hole 21 from the left, the flange 62 acts as a stopper for preventing a rightward movement of the shaft body 61.

Under the condition in which the shaft body 61 has been completely inserted into the insertion hole 21, the cam 5 is mated with the shaft body 61 by inserting the shaft body 61 into the elongated opening 53 of the cam 5. Thereafter, one of the screws 64 is screwed into the threaded hole 63 on the right side of the shaft body 61 so that the cam 5 may reliably operate within the space 24 of the first bracket 2.

The operation lever 7 has an elongated opening 71 formed at a proximal end thereof for insertion of the left side portion of the shaft body 61 thereinto. When the operation lever 7 is mated with the shaft body 61, another screw 64 is screwed into the threaded hole 63 on the left side of the shaft body 61 to prevent removal of the operation lever 7 from the center shaft 6.

The operation lever 7 is biased towards the lower holding plate 29 by means of a coil spring 73 that has one end engaged in a hole 72 defined in this operation lever 7 ahead of the elongated opening 71 and the other end engaged in a hole 29a defined in the lower holding plate 29. The biasing force of the coil spring 73 acts to normally engage the teeth 41a of the two pawls 41 with the internally-toothed gear 34, thereby preventing rotation of the second bracket 3 relative to the first bracket 2 and maintaining the posture of the seat back S2.

Figure 6A:
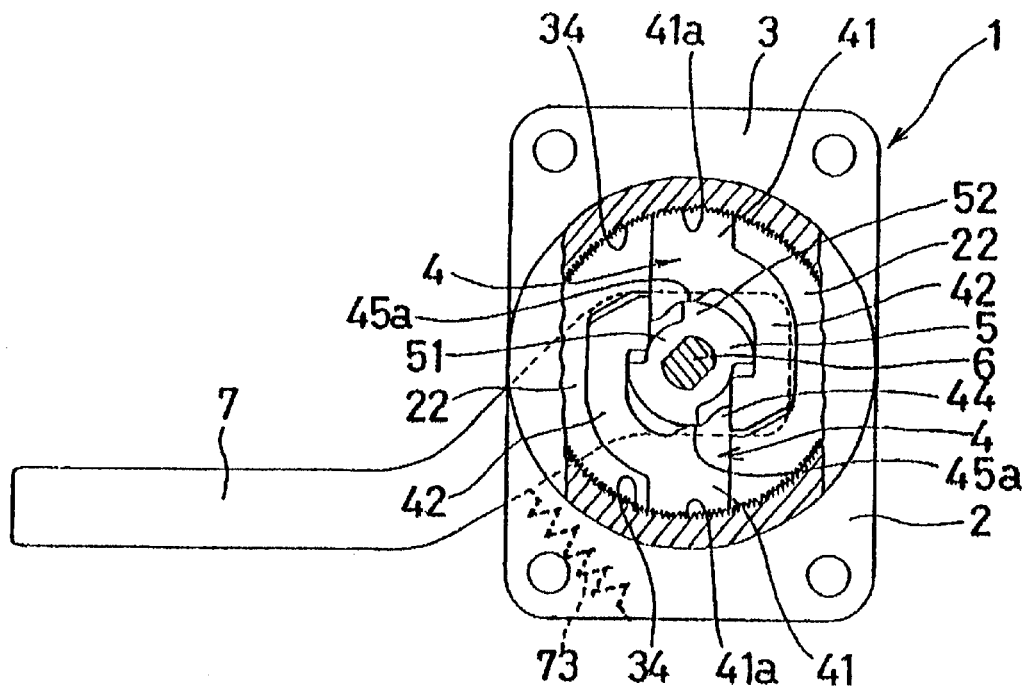
FIG. 6A is a side view, partly in section, of the reclining device of FIG. 3 when rotation of a second bracket has been locked.
Figure 6B:
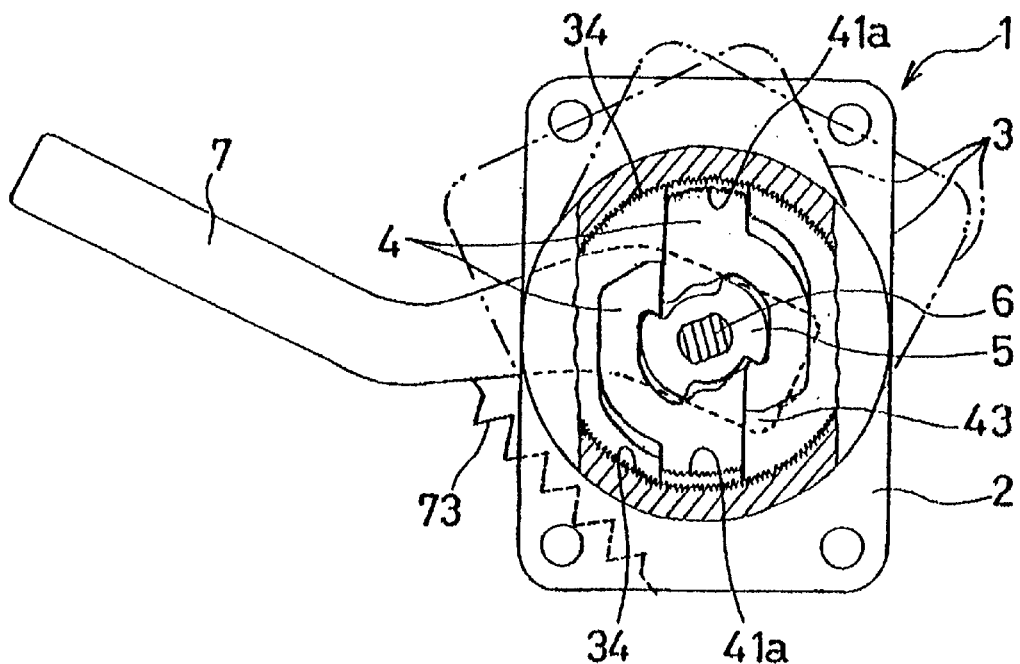
FIG. 6B is a view similar to FIG. 6A, but when the locking of the second bracket has been released.

FIG. 6A depicts the condition in which the second bracket 3 has been locked, while FIG. 6B depicts the condition in which the locking of the second bracket 3 has been released.

Under the condition shown in FIG. 6A, the operation lever 7 together with the cam 5 is biased counterclockwise by the biasing force of the coil spring 73, thereby causing the fan-shaped projections 52 of the cam 5 to press the inclined surfaces 45a of the lock gears 4 in the direction in which the two pawls 41 move away from each other. As a result, the teeth 41a of the pawls 41 are held in engagement with the internally-toothed gear 34 of the second bracket 3 to lock rotation of the second bracket 3 relative to the first bracket 2 and to maintain the angle of inclination of the seat back S2 relative to the seat cushion S1.

When the operation lever 7 is pulled up, the cam 5 is rotated clockwise together with the center or cam shaft 6. At this moment, the pressing of the inclined surface 45a of each lock gear 4 by one of the two corners of the associated fan-shaped projection 52 is released, and the other corner of the fan-shaped projection 52 presses the projection 43 to move the associated pawl 41 towards the cam shaft 6, resulting in disengagement of the teeth 41a from the internally-toothed gear 34. As a result, as shown by double-dotted chain lines in FIG. 6B, the second bracket 3 is allowed to rotate about the cam shaft 6 in any direction, making it possible to change the angle of inclination of the seat back S2 relative to the seat cushion S1.

After the seat back S2 has been set to a desired posture, when the operation lever 7 is released, the operation lever 7 together with the cam 5 is rotated counterclockwise by the biasing force of the coil spring 73, thereby engaging the teeth 41a with the internally-toothed gear 34, as shown in FIG. 6A, and maintaining them posture of the seat back S2.

Because each guide member 22 has a guide recess 23 formed away from the cam 5 and a lock gear 4 is slidably accommodated in the guide recess 23, the lock gear 4 is held in contact with the guide member 22 over a wider area, compared with the conventional locking structure in which each guide member has no guide recess. Accordingly, the locking structure according to the present invention can reduce looseness of the lock gear 4, making it possible to stabilize the posture of the seat back S2 and enhance the comfort when sitting on the seat.

Furthermore, according to the present invention, each lock gear 4 is not guided by only one guide member 22, but is guided by a plurality of neighboring members. That is, not only are the pair of lock gears 4 so configured as to be held in sliding contact with each other along the flat surfaces thereof extending in the direction of movement thereof, but also both of them are guided by the two guide members 22 under the condition in which the former are interposed between the latter, thereby further reducing looseness of the lock gears 4.

Figure 7:
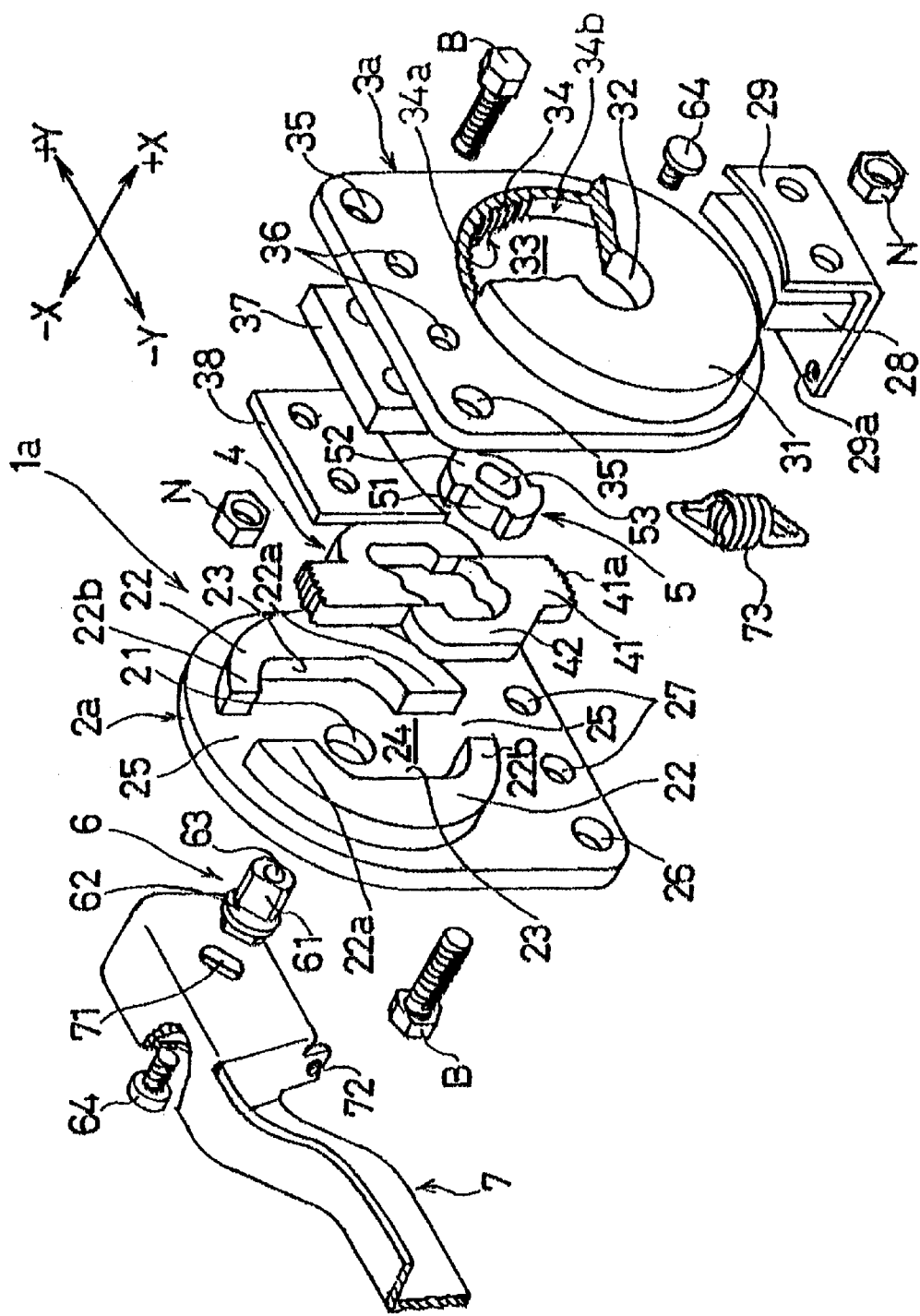
FIG. 7 is a view similar to FIG. 2, but according to a second embodiment of the present invention.

FIG. 7 depicts a locking structure 1a according to a second embodiment of the present invention.

According to the first embodiment of the present invention, an arcuated guide projection 22c formed on each guide member 22 of the first bracket 2 is received in a guide groove 31a formed in the second bracket 3, whereas according to the second embodiment of the present invention, the second bracket 3a has first and second inner peripheral surfaces 34a and 34b that are concentric with each other, and the first inner peripheral surfaces 34a are formed with internal teeth, while the second inner peripheral surfaces 34b are brought into sliding contact with outer peripheral surfaces of the guide members 22. The diameter of the first inner peripheral surfaces 34a are substantially equal to or slightly greater than that of the second inner peripheral surfaces 34b. By so doing, the first and second brackets 2a and 3a can be simplified in construction, because the guide members 22 of the first bracket 2a and the circularly protruding portion 31 of the second bracket 3a do not need the guide projections 22c and the guide grooves 31a as employed in the first embodiment, respectively.

It is to be noted here that although in the above-described embodiments the guide members 22 are formed on the first bracket 2 fixed to the seat cushion S1 and the internal teeth 34 are formed on the second bracket 3 fixed to the seat back S2, the internal teeth and the guide members may be formed on the first bracket 2 and the second bracket 3, respectively. In that case, because the operation lever 7 is rotated as the angle of inclination of the seat back S2 is changed, it is preferred that a generally circular dial-type operation member be used in place of the operation lever 7.

It is also to be noted that although the reclining device 1 with the operation lever 7 has been illustrated as being mounted on the left side of the driver seat, it may be mounted on the right side of the passenger seat in a laterally symmetric fashion.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A locking structure for a reclining seat having a seat cushion and a seat back pivotally mounted on the seat cushion, said locking structure comprising:

a first bracket to be fixed to the seat cushion and having a center hole;

a second bracket to be fixed to the seat back and having a center hole;

first and second projections formed on one of said first and second brackets and each having first and second flat surfaces opposite to each other, the first and second flat surfaces of said first projection confronting the second and first flat surfaces of said second projection, respectively, and extending parallel thereto;

the other of said first and second brackets having a recess defined therein and an internally-toothed gear formed around said recess, said first and second projections being received in said recess so that said second bracket can be rotated relative to said first bracket;

first and second lock gears each having a pawl engageable with said internally-toothed gear, said first lock gear being slidably interposed between the first flat surface of said first projection and the second flat surface of said second projection, said second lock gear being slidably interposed between the second flat surface of said first projection and the first flat surface of said second projection;

a cam for moving said first and second lock gears selectively away from and towards each other; and a cam shaft connected to said cam for rotation together therewith, said cam shaft having a diameter smaller than a diameter of said center hole of said first bracket and smaller than a diameter of said center hole of said second bracket such that said cam shaft is sufficiently loosely inserted in said center hole of said first bracket and said center hole of said second bracket so as to allow smooth rotation of said cam shaft relative to said first and second brackets even upon misalignment of a longitudinal axis of said cam shaft relative to longitudinal axes of said center holes of said first and second brackets, to thereby prevent a biased action in which only one of said first and second lock gears is held in mesh with said internally-toothed gear.

2. The locking structure according to claim 1 further comprising third and fourth projections formed on said first and second projections, respectively, and slidably received in a guide groove formed radially inwardly of said internally-toothed gear.

3. The locking structure according to claim 1, wherein said center hole of one of said first and second brackets is smaller than said center hole of the other of said first and second brackets.

4. A locking structure for a reclining seat having a seat cushion and a seat back pivotally mounted on the seat cushion, said locking structure comprising:

a first bracket to be fixed to the seat cushion;

a second bracket to be fixed to the seat back;

first and second projections formed on one of said first and second brackets and each having first and second flat surfaces opposite to each other, the first and second flat surfaces of said first projection confronting the second and first flat surfaces of said second projection, respectively, and extending parallel thereto;

the other of said first and second brackets having a recess defined therein and an internally-toothed gear formed around said recess, said first and second projections being received in said recess so that said second bracket can be rotated relative to said first bracket;

first and second lock gears each having a pawl engageable with said internally-toothed gear, said first lock gear being slidably interposed between the first flat surface of said first projection and the second flat surface of said second projection, said second lock gear being slidably interposed between the second flat surface of said first projection and the first flat surface of said second projection;

a cam for moving said first and second lock gears selectively away from and towards each other; and a cam shaft connected to said cam for rotation together therewith and loosely inserted into a center hole defined in said first bracket and into a center hole defined in said second bracket;

wherein each of said first and second lock gears has first and second flat surfaces extending in a direction of movement thereof, the first flat surface of said first lock gear being held in sliding contact with the second flat surface of said second lock gear, the second flat surface of said first lock gear being held in sliding contact with the first flat surface of said second lock gear.

5. The locking structure according to claim 4 further comprising third and fourth projections formed on said first and second projections, respectively, and slidably received in a guide groove formed radially inwardly of said internally-toothed gear.

* * * * *